United States Patent [19]
Phillips et al.

[11] Patent Number: 5,893,085
[45] Date of Patent: Apr. 6, 1999

[54] DYNAMIC FUZZY LOGIC PROCESS FOR IDENTIFYING OBJECTS IN THREE-DIMENSIONAL DATA

[76] Inventors: Ronald W. Phillips, 2216 Belton Dr., Arlington, Tex. 76004; James L. Nettles, 2932 Gray Oak Dr., Euless, Tex. 76039

[21] Appl. No.: 872,280

[22] Filed: Jun. 10, 1997

[51] Int. Cl.⁶ ..................................................... G06F 9/44
[52] U.S. Cl. ............................... 706/52; 706/50; 706/900
[58] Field of Search ............................... 706/50, 52, 900; 382/190

[56] References Cited

U.S. PATENT DOCUMENTS

| | | | |
|---|---|---|---|
| 5,200,422 | 4/1993 | Olesen et al. | 514/387 |
| 5,565,483 | 10/1996 | Hewawasam et al. | 514/411 |
| 5,631,970 | 5/1997 | Hsu | 382/113 |
| 5,640,468 | 6/1997 | Hsu | 382/190 |
| 5,644,386 | 7/1997 | Jenkins et al. | 356/4.01 |

FOREIGN PATENT DOCUMENTS

| | | |
|---|---|---|
| 477819 | 4/1992 | European Pat. Off. . |
| WO 93/08800 | 5/1993 | WIPO . |

OTHER PUBLICATIONS

Ahmed, F. et al., "Some Features of the Spasmogenic Actions of Acetylcholine and Histamine in Guinea–Pig Isolated Trachealis", *Br. J. Pharmacol.*, 83, pp. 227–233 (1984).

Baró, I. and Escande, D., "A $Ca^{2+}$–activated $K^+$ Current in Guinea–pig Atrial Myocytes", *Pflügers Archiv.*, 414(Suppl. 1), pp. S168–S170 (1989).

Cook, N. S., "The Pharmacology of Potassium Channels and Their Therapeutic Potential", *Trends in Pharmacol. Sciences*, 9, pp. 21–28 (Jan., 1988).

Koh, D.–S., et al., "Effect of the Flavoid Phloretin on $Ca^{2+}$–activated $K^+$ Channels in Myelinated Nerve Fibres of Xenopus Laevis", *Neuroscience Lett.* 165, pp. 167–170 (1994).

Laurent, F. et al., "Evaluation of the Relaxant Effects of SCA40, A Novel Charybdotoxin–Sensitive Potassium Channel Opener, in Guinea–Pig Trachealis", *Br. J. Pharmacol.*, 108, pp. 622–626 (1993).

Masoud, M. S., et al., "Spectral Studies on Some 2–Quinolones", *Spectroscopy Letters*, 21(6), pp.369–383 (1988).

Masoud, M. S., et al., "Solution Equilibria and Structures of Some 2–Quinolone Iron (III), Cobalt (II), Nickel(II) and Copper(II) Complexes", *Synth. React. Inorg. Met.–Org. Chem.*, 17, (8 & 9), pp. 881–899 (1987).

Mohammed, Y. S., et al, "Synthesis of 4–Substituted–3–hydroxy–2–quinolones and Azines", *Pharmazie*, 40, pp. 312–314 (1985).

Olesen, S.–P., et al, "Selective Activation of $Ca^{2+}$–dependent $K^+$ channels by Novel Benzimidazolone", *European J. Pharmacol.*, 251, pp. 53–59 (1994).

Quast, U. and Cook, N. S., "Moving Together: $K^+$ Channel Openers and ATP–sensitive $K^+$ Channels", *Trends in Pharmacol. Sciences*, 10, pp. 431–435 ~Nov., 1989).

Singer, J. J. and Walsh, J. V., "Characterization of Calcium–activated Potassium Channels in Single Smooth Muscle Cells Using the Patch–clamp Technique", *Pflügers Archiv.*, 408, pp. 98–111 (1987).

*The Merck Index*, 11th Edition, pp. 1575 (1989).

Walser, A., et al, "Cyclization Products Derived from o–Benzoyl Malonanilates", *J. Org. Chem.* 38, (3), pp. 449–456 (1973).

*Primary Examiner*—George B. Davis
*Attorney, Agent, or Firm*—Arnold, White & Durkee

[57] ABSTRACT

A method employing fuzzy logic for identifying a detected object in LADAR data is disclosed. The method includes extracting a feature of the object; determining a confidence level in the extracted feature; comparing the extracted feature to a corresponding feature of a potential identification using a fuzzy logic process, and identifying the object. The comparison includes weighting at least one rule according to the confidence level in the extracted feature employed by the rule; shifting a membership function for the extracted feature responsive to the confidence level for the extracted feature; and executing the fuzzy logic process to obtain an indication of whether the segmented object corresponds to the potential identification.

78 Claims, 11 Drawing Sheets

DYNAMIC FUZZY LOGIC PROCESS FOR IDENTIFYING OBJECTS IN THREE-DIMENSIONAL DATA

BACKGROUND OF THE INVENTION

1. Field of the Invention

The present invention pertains to identifying objects in three-dimensional data and, more particularly, an automatic target recognition system employing a fuzzy logic process to identify targets in LADAR data.

2. Description of the Prior Art

Automatic target recognition ("ATR") systems identify objects represented in two-dimensional or three-dimensional data to determine whether they are potential targets. Three-dimensional data may be acquired in numerous ways and laser detection and ranging ("LADAR") systems are commonly employed for this purpose. In such systems, a laser signal is transmitted from a platform and, upon encountering an object, is reflected back to the platform. The platform can then process the reflected signal to obtain three-dimensional data regarding the object causing the reflection. Typically, this data includes a number of the object's features such as its height, length, and width. However, the platform typically transmits many laser signals across a general area that will contain a number of objects reflecting the signals. Thus, it is necessary for the ATR system to examine the data to see which reflecting objects might be of interest.

ATR systems are often divided into four subsystems: detection, segmentation, feature extraction, and identification. Identification can be described as the final process which takes inputs such as the features discussed above and establishes an identity for the object based on previously determined features of known objects. The accuracy of the identification depends on several factors including the correctness of the object features used in the comparison and the number of known objects constituting potential identifications.

The ATR system would ideally be able to compare completely accurate feature measurements against those of all known objects to establish the unknown object's identity. However, identification is frequently hampered by poor measurements such that, even if one of the potential identifications is correct, a complete match cannot be recognized. For instance, a length measurement might be compromised if part of the unknown object is obscured by a wall or fence and a width measurement might be affected by the orientation of the object relative to the platform. ATR system design constraints for size and speed may also affect performance.

An ATR system must therefore, as a practical matter, quickly establish the best possible identity with minimal computing resources. However, conventional computing techniques are poorly suited to meet these design constraints. For instance, conventional computing resources classically analyze information in two states such as "yes" and "no", or "true" and "false." An incomplete match in the comparison phase of a suitable operational ATR system cannot easily be represented in two states and consequently requires extensive analysis to produce a useable answer. The extensive analysis, in turn, consumes time and computing resources. This consumption becomes more acute as the list of potential identifications becomes more comprehensive since there typically will be no or, at most, only a few complete matches. Conventional computational techniques are consequently poorly adapted to meet the various design constraints in practically implementing an ATR system and, as demand for improved system performance rises, become still less suited. Thus, there is a need for a new method for identifying objects in three-dimensional data.

SUMMARY OF THE INVENTION

The present invention in one embodiment is a method employing fuzzy logic for identifying a detected object in LADAR data. The method includes extracting a feature of the object; determining a confidence level in the extracted feature; comparing the extracted feature to a corresponding feature of a potential identification using a fuzzy logic process, and identifying the object. The comparison includes weighting at least one rule according to the confidence level in the extracted feature employed by the rule; shifting a membership function for the extracted feature responsive to the confidence level for the extracted feature; and executing the fuzzy logic process to obtain an indication of whether the segmented object corresponds to the potential identification.

BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings.

DESCRIPTION OF ILLUSTRATIVE EMBODIMENTS

Numerous specific details are set forth below in the detailed description of particular embodiments in order to provide a thorough understanding of the present invention. However, one of ordinary skill in the art having the benefit of this disclosure will understand that the present invention may be practiced without many of the details presented since such details will be necessary or useful depending on the particular embodiment being employed. For instance, the invention is placed in the context of a complete ATR system including data acquisition and object detection to facilitate an understanding of the invention. Conversely, in other instances, well known details have not been described in detail for the sake of clarity so as not to obscure the invention. It will be appreciated that supplying such details would be a routine undertaking for those of ordinary skill in the art, even if a complex and time-consuming task, given the benefit of this disclosure.

Figure 1:
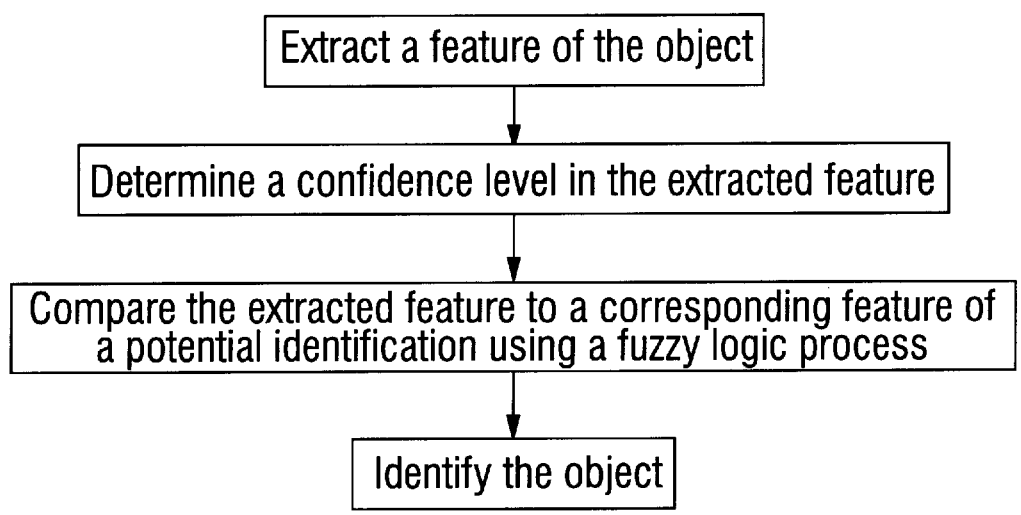
FIG. 1 one is a flow diagram of one particular embodiment of a method for identifying an object from a set of three-dimensional data in accord with the invention.

FIG. 1 is a flow diagram of one embodiment of a method for identifying an object as one of a plurality of potential identifications from a set of three-dimensional data employing a fuzzy logic process. The embodiment in FIG. 1 generally presumes that acquiring three-dimensional data regarding a scanned field of view including an object within a surrounding environment; detecting the object within the acquired data; and segmenting the detected object from the surrounding environment have previously been performed in any manner known to those in the art and as discussed more fully below in connection with FIG. 2. The embodiment of FIG. 1 thus comprises extracting a feature from the segmented object, determining a confidence level in the extracted feature, comparing the extracted feature to a corresponding feature of a potential identification using a fuzzy logic process, and identifying the object. The fuzzy logic process is employed to compare the extracted feature of the segmented object to a corresponding, previously stored feature of a potential identification. More particularly, the fuzzy logic process outputs an indication of the likelihood that the object corresponds to the potential identification. This embodiment then identifies the object from the indication of likelihood. Each of these steps is discussed in more detail below in connection with FIGS. 3–7.

Figure 2:
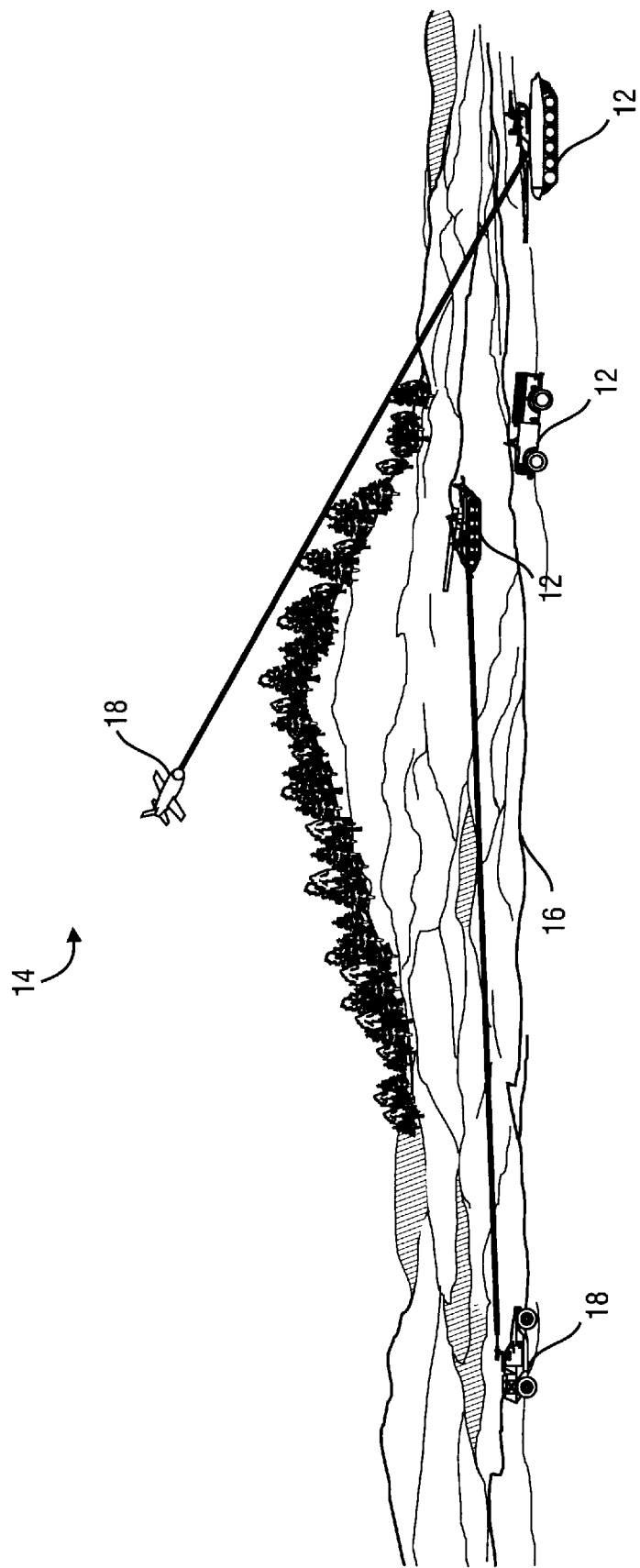
FIG. 2 illustrates the collection of three-dimensional data in one particular embodiment of the invention.

Referring now to FIG. 2, three-dimensional data regarding a scanned field of view including an object 12 within a surrounding environment 14 can be collected for use in the embodiment of FIG. 1 as follows. The object 12 may be either airborne or, as shown, on the ground 16. Preferably, the data is laser detection and ranging ("LADAR") data collected from a platform 18 that is airborne but platform 18 may also be on the ground 16. This LADAR data is generally acquired by scanning the field of view to generate rows and columns of discrete units of information known as "pixels" that are used to generate a two-dimensional "image" of the scanned field of view. However, the three-dimensional information is retained and correlated to the respective pixels. Data acquisition, and particularly LADAR data acquisition is well known in the art and any suitable technique may be employed. Suitable techniques are disclosed and claimed in U.S. Pat. Nos. 5,200,606; 5,224,109; and 5,285,461, each of which is hereby expressly incorporated by reference herein for all purposes as if fully set forth verbatim.

Once the three-dimensional data is acquired, the object 12 is detected from that data. Preferably, the object 12 is detected by examining the acquired data for indications of an identifying feature present in all potential identifications. Ascertaining what constitutes an "identifying feature" in this approach will necessarily depend on the potential identifications and it is possible that more than one identifying feature will be available. In some embodiments, it may be desirable to use more than one identifying feature to detect the object 12. Thus, the number of identifying features will necessarily depend on the particular embodiment implemented. The identifying feature from which the object 12 will be detected is preferably determined before the three-dimensional data is acquired, but some embodiments may make this determination dynamically.

The detected object 12 must be segmented from the surrounding environment 14 within the scanned field of view. Preferably, segmentation is performed by identifying which pixels in the two-dimensional image represent the object 12, and then discarding all other pixels in the image of the scanned field of view. However, segmentation techniques are well known in the art and any suitable segmentation technique may be applied. One such suitable technique is disclosed and claimed in application Ser. No. 08/371,284, filed Jan. 11, 1995, and entitled "Visual Recognition System for LADAR Systems," which is hereby expressly incorporated by reference herein as if set forth verbatim.

Another technique involves determining from the three-dimensional data the relative spatial separation of the objects represented by adjacent pixels in the two-dimensional image. For instance, if a pixel represents part of the identifying feature of object 12 and if an adjacent pixel represents some surface that is less than a predetermined distance from the first pixel, then the two pixels are considered to represent different parts of the object 12 being segmented. Otherwise, the adjacent pixel is considered to represent some surface in the surrounding environment as opposed to the object 12 and is discarded.

Now referring to FIG. 1, at least one feature is extracted from the segmented object 12. In one particular embodiment, a value is ascertained for the extracted feature, typically by measuring it from the three-dimensional data associated with the pixels of the segmented object 12. Feature extraction is known to the art and any suitable technique may be employed.

Still referring to FIG. 1, a determination is also made regarding the confidence level in the extracted feature. For example, in the embodiment where the feature is extracted by ascertaining the value thereof, the confidence in the accuracy of the ascertained value is determined. For instance, if there is a possibility that the object 12 in FIG. 2 is at least partially obscured, then there is not much confidence that a length measurement is correct. These measurement errors typically do not arise from errant data collection, but more usually from obscuration of the object 12. The actual length of a vehicle located partially behind an obstacle such as a bush, fence, or wall, for example, will be greater than the measured length because the portion obscured by the obstacle will not be measured.

One particular embodiment of the invention segments the object and extracts features by employing the range to the object 12 rotated by the aspect angle and a mask indicating which pixels are target pixels for a minimum enclosing rectangular window around the object 12. The window contains all target pixels and a one pixel wide boundary around the target to determine the confidence level. Using the target pixel mask, boundary pixels are identified in a one pixel wide band around the object 12 by examining background pixels that are four-way adjacent to a given target and flag them based on their four-way position with respect to the target pixel (i.e. top, bottom, left, right). This border pixel identification procedure will return a border mask containing 4 bit flags per pixel denoting which pixels are border pixels and their position with respect to adjacent target pixels. Using the border pixel mask, the range rotated by the estimated angle, and the estimated minimum and maximum target dimensions in two dimensions obscuring pixels are identified as a subset of the border pixels. Obscuring pixels are border pixels for which (1) the range to a potentially obscuring pixel will be less than the range to at least one pixel that is adjacent to it as defined in the border pixel mask, and (2) the rotated coordinates lie beyond the minimum or maximum extents thereof. The pixels that meet this first criteria must also lie beyond the minimum or maximum extents of the rotated two dimensional range to be respectively length and width obscuring. A statistic giving a likelihood of target length or width obscuration may be defined as the ratio of the number of actual obscuring pixels in length, width as defined by the above criteria to the number of potential obscuring pixels in length, width. Such a ratio can then be used as the determination of the confidence in the associated length or width measurement.

Figure 3:
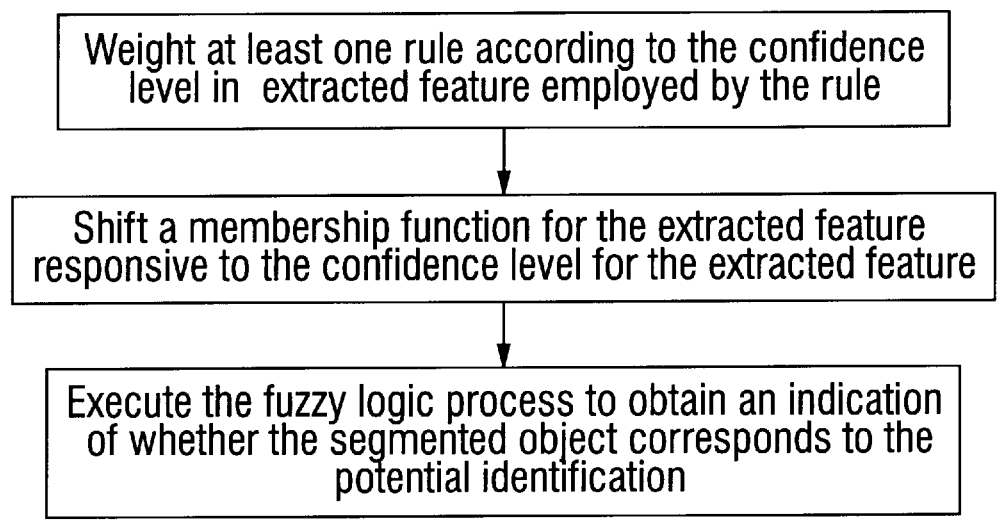
FIG. 3 diagrams the task of comparing features extracted from a detected, segmented object with corresponding features from a potential identification in one particular embodiment of the invention.

Referring again to FIG. 1, the extracted feature of the segmented object 12 is then compared with a corresponding feature of a potential identification using a fuzzy logic process. Comparison with the fuzzy logic process in one embodiment of the invention is illustrated more particularly in FIG. 3. Comparing the extracted feature, as shown in FIG. 3, generally comprises weighting at least one rule according to the confidence level in the extracted feature employed by the rule, shifting a membership function for the extracted feature responsive to the confidence level in the extracted feature, and executing the fuzzy logic process to obtain an indication of whether the segmented object corresponds to the potential identification.

In general, fuzzy logic systems consist of: input variables, output variables, membership functions defined over the variables' ranges, and fuzzy rules or propositions relating inputs to outputs through the membership functions. In the present embodiment of the invention, the extracted feature is the input variable, the indication of the likelihood is the output variable, and the rules relate the extracted feature to the likelihood that the feature corresponds to the potential identification. The aggregation of all rules is the basis for the fuzzy logic inferencing process. The fuzzy logic process of the particular embodiment of the invention disclosed herein also utilizes temporary variables defined as "weights" to weight the rules as described immediately below.

Figure 4:
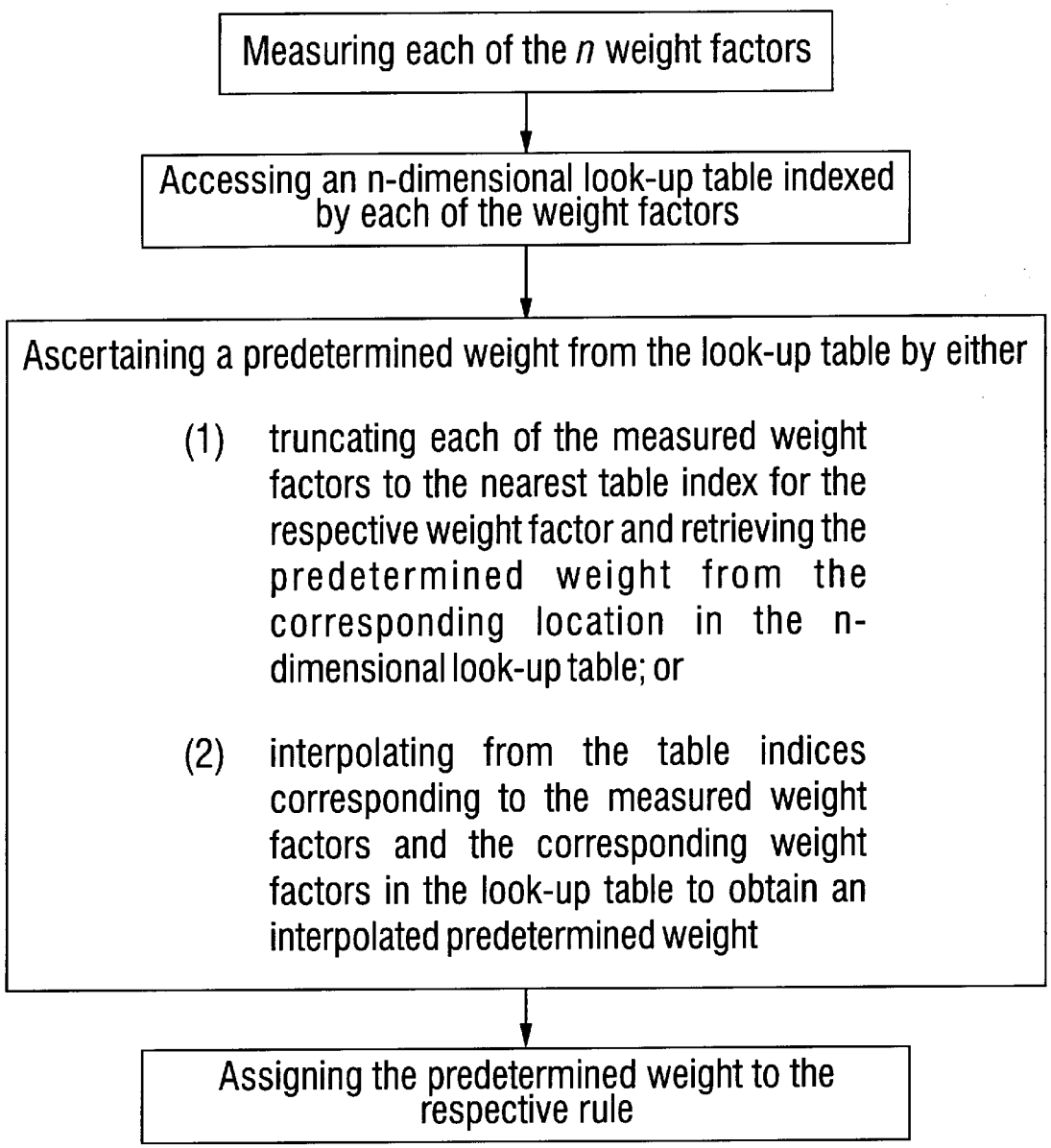
FIG. 4 diagrams rule weighting as practiced in one particular embodiment of the invention.

Rules are weighted according to the extracted feature employed by the rule and according to n weight factors as is illustrated in FIG. 4. Weights are values assigned to rules that range from zero to one where a weight of zero effectively eliminates that rule's contribution to the inferencing process. The predetermined weights themselves range in value from 0.0 to 1.0 and may be derived by any manner known to the art, including calculations from models and educated deduction, and represent an understanding of the limitations associated with measuring a particular feature under certain circumstances. Thus, a fuzzy logic system inferencing process that was temporally static can be made dynamic over time by adjusting rule weights.

Weighting the rules in this particular embodiment generally includes measuring each of the n weight factors; accessing an n-dimensional look-up table indexed by each of the weight factors; and ascertaining a predetermined weight stored in the look-up table. The resolution of the indices must be traded with system resources and performance as will be appreciated by those of ordinary skill in the art having the benefit of this disclosure. For instance, indices having greater resolution will require a correspondingly larger memory to store all the values for the look-up table. On the other hand, lower resolution in some embodiments may require more processing although less memory. Still further, some indices might have better or poorer resolution in a given embodiment depending upon whether they generally indicate more or less reliability for an extracted feature. Generally, a predetermined weight is ascertained from the table by either (1) truncating each of the measured weight factors to the nearest table index for the respective weight factor and retrieving the predetermined weight from the corresponding location in the n-dimensional look-up table, or (2) interpolating from the table indices to the weight factors to obtain an interpolated predetermined weight. One particular embodiment uses successive applications of a four-point La Grangian interpolation, but other techniques might be suitable depending on system design constraints size, speed, and accuracy. The predetermined weight is then assigned to the respective rule.

Returning to FIG. 3, in the embodiment illustrated, at least one membership function is then shifted responsive to the confidence in the feature measurement. In a dynamic fuzzy system, the capacity for changed behavior can be achieved through the membership functions. Changing a membership function is analogous changing its definition.

Referring still to FIG. 3, the extracted features are then finally compared with the previously stored features for each potential identification by executing the fuzzy logic process in any suitable manner known to the art. The fuzzy logic process generally includes the subprocesses known as "fuzzification," "inference," "composition," and "defuzzification." Essentially and generally, "fuzzification" involves scaling the input variables, "inferencing" involves executing the rulebase, "composition" involves the aggregation of all of the rule consequents into the fuzzy output, and "defuzzification" typically involves the determination of a single crisp output (e.g., 0.85) from the fuzzy output. Each of these subprocesses can be performed in a variety of ways. The particular subprocesses employed in the fuzzy logic process is not material to the practice of the invention provided that, (1) there is an ability to weight rules, and (2) there is a capability for shifting membership functions. Details of a particular fuzzy logic process can be found in either of the commercially available, off-the-shelf software packages or any other fuzzy logic tool that may be known to those skilled in the art.

Indeed, there are numerous commercially available, off-the-shelf software packages that can be used to perform the necessary comparison, i.e., execution of the fuzzy logic process, perhaps with some modification. Among these are:

(1) "CubiCalc," available from Hyperlogic Corporation, 1855 East Valley Parkway, Suite 210, P.O. Box 300010, Escondido, Calif. 92039-0010; and (2) "MATLAB," with the add-in module "Fuzzy Logic Toolbox," available from The Math Works, Inc., 24 Prim Park Way, Natick, Mass. 01760.

However, a source-code license may be necessary from the copyright owners to access the source code for appropriate modifications necessary to implement the invention as described herein. For instance, one particular embodiment employs the CubiCalc package that stores membership functions as a series of arrays. To dynamically shift the membership function requires access to the internally stored arrays, but there is no such facility within the software package. Thus, the code source was needed and additional code was written to access and modify the arrays.

Referring again to FIG. 3, indication of the likelihood of whether the segmented object 12 corresponds to a potential identification is output from the fuzzy logic process. This indication may be the likelihood itself or some other indication suitable to the particular implementation of the invention. In this particular embodiment the defuzzified output of the fuzzy logic process corresponds to the likelihood that the detected, segmented object 12 corresponds to the potential identification under consideration.

Figure 8:
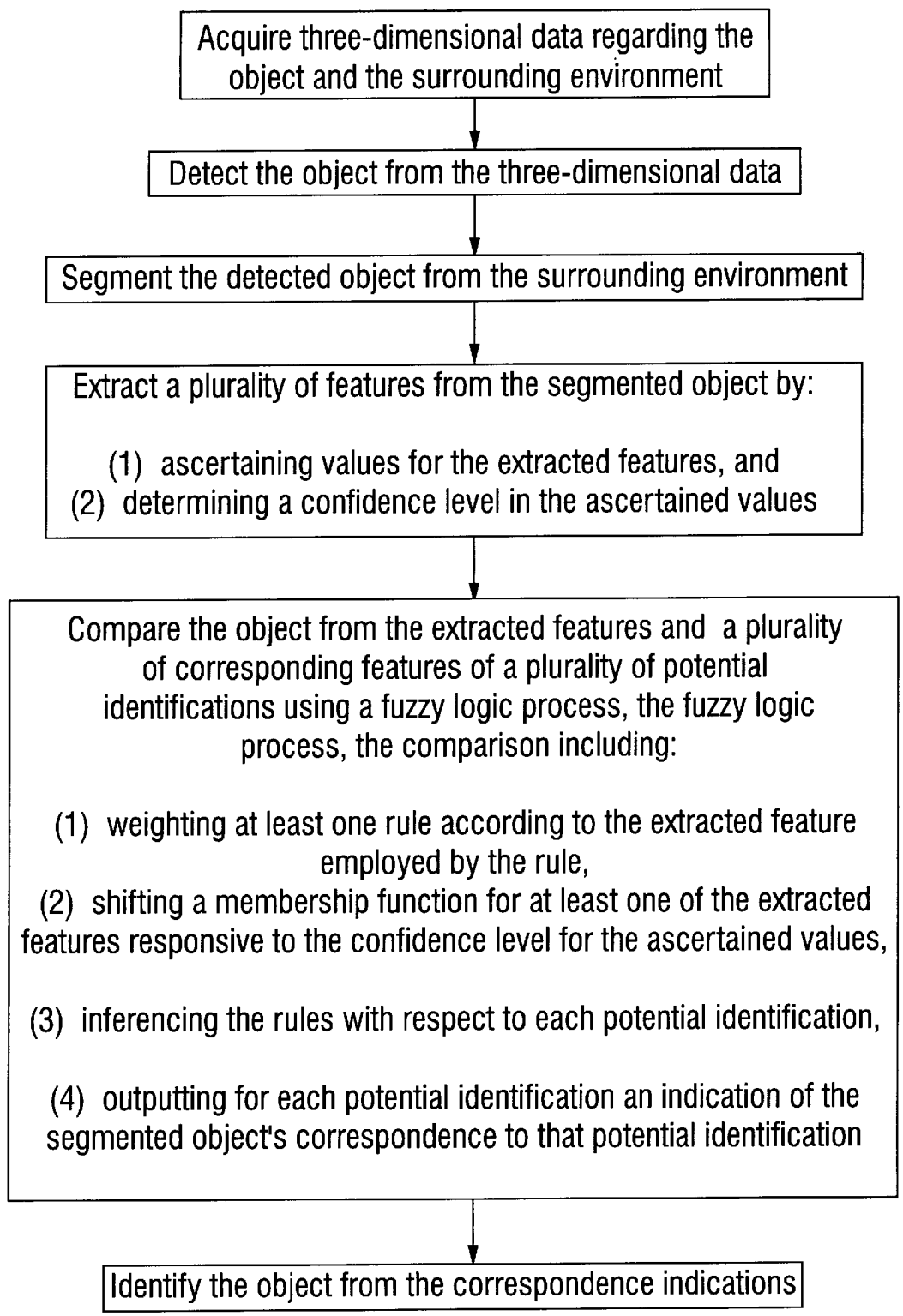
FIG. 8 diagrams one particular embodiment of the present invention alternative to that in FIG. 1.

One particular alternative embodiment of that illustrated in FIGS. 1 and 3–4 is illustrated in FIG. 8. Three-dimensional data acquisition, detection, and segmentation may be performed as is discussed above in connection with FIG. 2. In the particular embodiment of the invention disclosed in FIG. 8 and discussed below, the extracted features are the length, width, height, average height, and hull height of the object 12.

As set forth above, the extracted features are variables in the fuzzy logic process. The variables utilized by the particular embodiment disclosed herein are set forth in Table 1. The fuzzy logic system of the particular embodiment also shifts membership functions.

TABLE 1

Fuzzy Logic System Variables

| Variable Name | Variable Definition | Variable Type | Initial (Default) Value |
|---|---|---|---|
| Length | extracted feature - measured length of the object | Input | 0.00000 |
| Chance | indication of possibility that the object corresponds to a particular potential identification | Output | 0.00000 |
| Width | extracted feature - measured width of the object | Input | 0.00000 |
| Height | extracted feature - measured height of the object | Input | 0.00000 |
| AvgHeight | calculated average height of the object | Input | 0.00000 |
| HullHeight | calculated height of the object's hull | Input | 0.00000 |
| WtLengthCor | weight predicated on the correctness of the measured length | Weight | 1.00000 |
| WtLengthUnd | weight predicated on whether the measured length is under the range of correct values | Weight | 1.00000 |
| WtLengthOvr | weight predicated on whether the measured length is over the range of correct values | Weight | 1.00000 |
| WtWidthCor | weight predicated on the correctness of the measured width | Weight | 1.00000 |
| WtWidthUnd | weight predicated on whether the measured width is under the range of correct values | Weight | 1.00000 |
| WtWidthOvr | weight predicated on whether the measured width is over the range of correct values | Weight | 1.00000 |
| WtHeightCor | weight predicated on the correctness of the measured height | Weight | 1.00000 |
| WtHeightUnd | weight predicated on whether the measured height is under the range of correct values | Weight | 1.00000 |
| WtHeightOvr | weight predicated on whether the measured height is over the range of correct values | Weight | 1.00000 |
| WtAvgHeightCor | weight predicated on the correctness of the calculated average height | Weight | 1.00000 |
| WtAvgHeightUnd | weight predicated on whether the calculated average height is under the range of correct values | Weight | 1.00000 |
| WtAvgHeightOvr | weight predicated on whether the calculated average height is over the range of correct values | Weight | 1.00000 |
| WtHullHeightCor | weight predicated on the correctness of the calculated hull height | Weight | 1.00000 |
| WtHullHeightUnd | weight predicated on whether the calculated hull height is under the range of correct values | Weight | 1.00000 |
| WtHullHeightOvr | weight predicated on whether the calculated hull height is over the range of correct values | Weight | 1.00000 |

Table 1 lists the system variables in alphabetical order for convenience and the ordering has no significance to the invention. Note that the extracted features, Length, Width, Height, AverageHeight, and HullHeight in this embodiment, are inputs to the fuzzy logic process. The output variable Chance is used in identifying the object 12 as one of a plurality of potential identifications as will subsequently be explained in greater detail.

The rule weights are then determined and applied in the manner described above. For each input variable in Table 1 there are corresponding weights for "over," "under," and "correct" although the scope of the invention is not so limited. For instance, for the input variable Length, there are weights called WtLengthCor, WtLengthOvr, and WtLengthUnd. The weighted rules of the particular embodiment disclosed herein are set forth in Table 2 below.

TABLE 2

Weighted Rules (WtLengthCor) if Length is Correct then Chance is High
(WtLengthCor) if Length is Not Correct then Chance is Low
(WtLengthUnd) if Length is Under then Chance is Low
(WtLengthUnd) if Length is Very Under then Chance is Really Low
(WtLengthOvr) if Length is Over then Chance is Low
(WtLengthOvr) if Length is Very Over then Chance is Really Low
(WtWidthCor) if Width is Correct then Chance is High
(WtWidthCor) if Width is Not Correct then Chance is Low
(WtWidthUnd) if Width is Under then Chance is Low
(WtWidthUnd) if Width is Very Under then Chance is Really Low
(WtWidthOvr) if Width is Over then Chance is Low
(WtWidthOvr) if Width is Very Over then Chance is Really Low
(WtHeightCor) if Height is Correct then Chance is High
(WtHeightCor) if Height is Not Correct then Chance is Low
(WtHeightUnd) if Height is Under then Chance is Low
(WtHeightUnd) if Height is Very Under then Chance is Really Low
(WtHeightOvr) if Height is Over then Chance is Low
(WtHeightOvr) if Height is Very Over then Chance is Really Low
(WtAvgHeightCor) if AvgHeight is Correct then Chance is High
(WtAvgHeightCor) if AvgHeight is Not Correct then Chance is Low
(WtAvgHeightUnd) if AvgHeight is Under then Chance is Low
(WtAvgHeightUnd) if AvgHeight is Very Under then Chance is Really Low
(WtAvgHeightOvr) if AvgHeight is Over then Chance is Low
(WtAvgHeightOvr) if AvgHeight is Very Over then Chance is Really Low
(WtHullHeightCor) if HullHeight is Correct then Chance is High
(WtHullHeightCor) if HullHeight is Not Correct then Chance is Low
(WtHullHeightUnd) if HullHeight is Under then Chance is Low
(WtHullHeightUnd) if HullHeight is Very Under then Chance is Really Low
(WtHullHeightOvr) if HullHeight is Over then Chance is Low
(WtHullHeightOvr) if HullHeight is Very Over then Chance is Really Low
if Length is Very Over or Width is Very Over or Height is Very Over or AvgHeight
is Very Over or HullHeight is Very Over then Chance is Really Low Table 2 is the collection of all rules, used in the fuzzy logic system of the particular embodiment disclosed herein although the invention is not so limited. Table 2 thus constitutes the system's "rulebase" or "knowledge base." Each quantity in parentheses is a weight, that may be changed from a default value of 1 as set forth below. The portion of each rule between the "if" and the "then" inclusive is the rule's "premise" or "antecedent." In the particular embodiment disclosed, there are six premises applied to each input variable. The portion of the rule following the "then" is the rule's "conclusion" or "consequent." The conclusion, or consequent of each rule actually assigns a membership function to the output value. In this particular embodiment, the conclusion assigns the value High, Low or ReallyLow to the variable Chance.

With the LADAR data of the particular embodiment described, it is beneficial to employ the dynamic mechanism represented by weighted rules. The benefits arise from knowledge of the circumstances under which the data was collected, which knowledge provides valuable insight with regard to which of many rules may presently be most appropriate. Inferences from weighted rules based on the "at present" susceptible information are diminished with rule weights varying from one (1.0) to zero (0.0). Thus, the criterion for identification is adjusted to take advantage of present circumstances. For example, if the depression angle from the sensor to the object is very shallow, and the view of the object is almost exclusively of the front or back, then under these circumstances estimating the length of the object can be very difficult. That is, the estimate of length may be very fragile or, alternatively, under these circumstances the length measurement derived from the LADAR data is not a robust feature. The weights lessen the influence of rules acting upon measurements known to be predicated on unreliable information. Conversely, the weights strengthen the influence of rules predicated on measurements known to be reliable. Thus, using rule weights to diminish inferences that rely on fragile information is a powerful mechanism for improving the identification process.

The embodiment illustrated utilizes three weight factors-the depression angle from the sensor aboard the platform 18 to the object 12 (both shown in FIG. 2), the object 12's orientation with respect to the sensor aboard platform 18, and the pixel resolution on the object 12. The first two of these factors are graphically illustrated in FIGS. 5A–5D from the vantage point of the airborne platform 18. FIGS. 5A–5D illustrate an object 12 from a 90°, 45°, 0°, and 0° depression angle, respectively, and a 30°, 30°, 30°, and 90° object aspect angle, respectively. For present purposes, the pixel resolution is the angular separation in radians between neighboring pixels multiplied by the range from the sensor aboard the platform 18. Thus, pixels separated by 0.005 radians at a range of 100 meters implies a pixel resolution of 0.50 meters. However, the scope of the invention is not limited to these particular weight factors. These weight factors were selected because it is known that they affect the accuracy, correctness, or reliability of measurements derived from the acquired data. Thus, in other contexts, other weight factors may be more desirable as more accurately reflecting the reliability of the extracted features and more or less than three weight factors might be employed.

In the particular embodiment illustrated, the three weight factors index a three-dimensional look-up table for the Length and Width extracted features but such a table can be used with any or all extracted features. Each table employs a resolution of four depression angles, five pixel resolutions, and seven object aspect angles for a 140 entry table. Each of the 140 entries is a predetermined weight associated with the three weight factors that index it. Furthermore, there is such an n-dimensional lookup table for each potential target identification. The particular embodiment illustrated employs one such three-dimensional table for each of the input variables Length and Width for each potential identification. Other embodiments might employ as many as one n-dimensional table per extracted feature per potential identification.

Figure 5A:
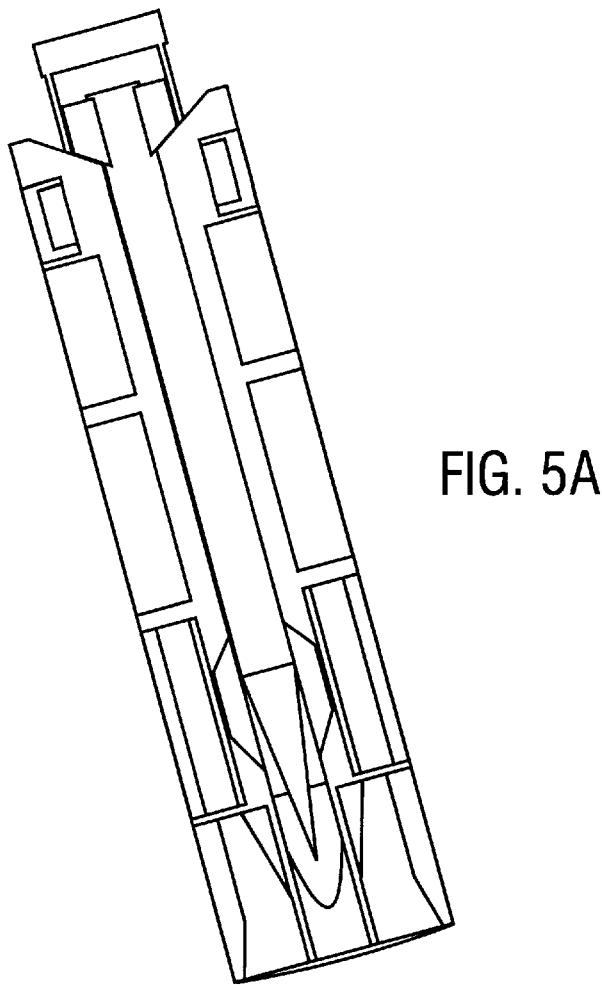
FIG. 5A, 5B, 5C and 5D illustrate concepts associated with some of the weight factors used in rule weighting in one particular embodiment of the invention.
Figure 5B:
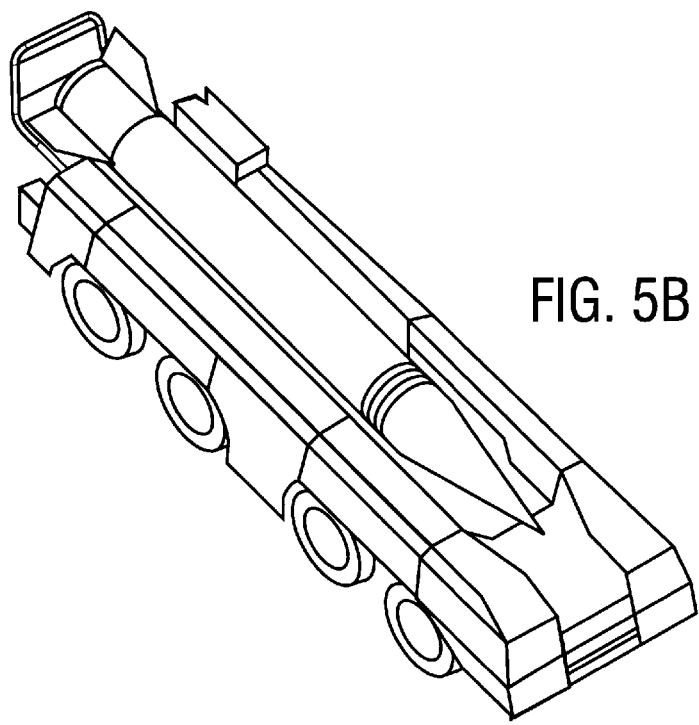
Figure 5C:
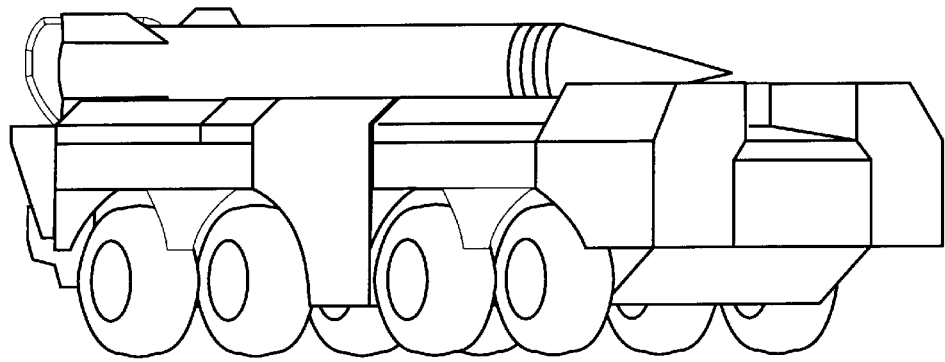
Figure 5D:
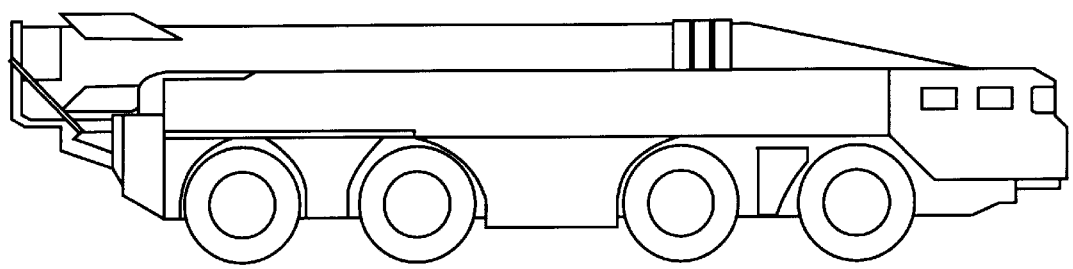

As noted earlier, the predetermined weights themselves range in value from 0.0 to 1.0 and may be derived by any manner known to the art, including calculations from models and educated deduction, and represent an understanding of the limitations associated with measuring a particular feature under certain circumstances. For example, FIGS. 5A–5C depict an object approximately 13 meters long and 3 meters wide. Assuming a pixel resolution of 0.50 meters or less, the weight factors from the view in FIG. 5A might yield a weight of 1.0 for rules employing length and width indicating a complete confidence in their reliability. In FIG. 5D, however, weights associated with rules relying the width factor might be 0.0, indicating a complete absence of confidence in the reliability of the width measurement.

The predetermined weight is then assigned to the respective rule. Reference to Table 2 shows that not every rule includes a weight indicated in parentheses. Such rules carry an implied weight of 1 and this may be true of other embodiments as well. However, it is generally desirable to weight the rules where possible to diminish the influence of unreliable features while bolstering the influence of reliable features. Thus, other embodiments might utilize rulebases in which all rules carry dynamic weights.

Once the rules are weighted, the membership functions may be shifted where desired. In the particular embodiment illustrated, there are three membership functions (also referred to as "adjectives" in fuzzy speak)—these are: Under, Correct, and Over. The default definitions of these membership functions is set forth in Table 3.

TABLE 3

Membership Function Definitions

| Variable | Membership Function | Defining Coordinates x Axis | y Axis |
|---|---|---|---|
| Length | Under | 0.0000 | 1.0000 |
| | | 10.180 | 1.0000 |
| | | 11.450 | 0.0000 |
| | | 16.000 | 0.0000 |
| | Correct | 0.0000 | 0.0000 |
| | | 8.7900 | 0.0000 |
| | | 12.450 | 0.9900 |
| | | 13.260 | 1.0000 |
| | | 15.130 | 0.0000 |
| | | 16.000 | 0.0000 |
| | Over | 0.0000 | 0.0000 |
| | | 14.590 | 0.0000 |
| | | 15.750 | 1.0000 |
| | | 16.000 | 1.0000 |
| Chance | Really Low | −0.250 | 1.0000 |
| | | 0.5000 | 0.0000 |
| | | 1.2500 | 0.0000 |
| | Low | −0.250 | 0.2000 |
| | | 0.5000 | 0.0000 |
| | | 1.2500 | 0.0000 |
| | High | −0.250 | 0.2000 |
| | | 0.5000 | 0.0000 |
| | | 1.2500 | 0.0000 |
| Width | Under | 0.0000 | 1.0000 |
| | | 1.9500 | 1.0000 |
| | | 2.2900 | 0.0000 |
| | | 6.0000 | 0.0000 |
| | Correct | 0.0000 | 0.0000 |
| | | 1.0000 | 0.0000 |

TABLE 3-continued

Membership Function Definitions

| Variable | Membership Function | Defining Coordinates x Axis | y Axis |
|---|---|---|---|
| | | 2.5700 | 0.8700 |
| | | 3.2000 | 1.0000 |
| | | 3.5600 | 0.0000 |
| | | 6.0000 | 0.0000 |
| | Over | 0.0000 | 0.0000 |
| | | 3.5200 | 0.0000 |
| | | 3.9700 | 1.0000 |
| | | 6.0000 | 1.0000 |
| Height | Under | 0.0000 | 1.0000 |
| | | 2.1400 | 1.0000 |
| | | 2.5200 | 0.0000 |
| | | 5.0000 | 0.0000 |
| | Correct | 0.0000 | 0.0000 |
| | | 2.6600 | 0.0000 |
| | | 2.8400 | 0.9700 |
| | | 3.2000 | 1.0000 |
| | | 3.5700 | 0.0000 |
| | | 5.0000 | 0.0000 |
| | Over | 0.0000 | 0.0000 |
| | | 3.4600 | 0.0000 |
| | | 3.8000 | 1.0000 |
| | | 5.0000 | 1.0000 |
| AvgHeight | Under | 0.0000 | 1.0000 |
| | | 1.2900 | 1.0000 |
| | | 1.6100 | 0.0000 |
| | | 5.0000 | 0.0000 |
| | Correct | 0.0000 | 0.0000 |
| | | 1.4200 | 0.0000 |
| | | 1.6800 | 0.8700 |
| | | 2.2200 | 1.0000 |
| | | 2.4400 | 0.0000 |
| | | 5.0000 | 0.0000 |
| | Over | 0.0000 | 0.0000 |
| | | 2.4000 | 0.0000 |
| | | 2.6400 | 1.0000 |
| | | 5.0000 | 1.0000 |
| Hull Height | Under | 0.0000 | 1.0000 |
| | | 1.4600 | 1.4600 |
| | | 1.8300 | 1.8300 |
| | | 5.0000 | 5.0000 |
| | Correct | 0.0000 | 0.0000 |
| | | 1.4700 | 0.0000 |
| | | 2.0600 | 0.8800 |
| | | 2.4500 | 1.0000 |
| | | 3.0300 | 0.0000 |
| | | 5.0000 | 0.0000 |
| | Over | 0.0000 | 0.0000 |
| | | 2.7300 | 0.0000 |
| | | 2.8700 | 1.0000 |
| | | 5.0000 | 1.0000 |

Figure 7:
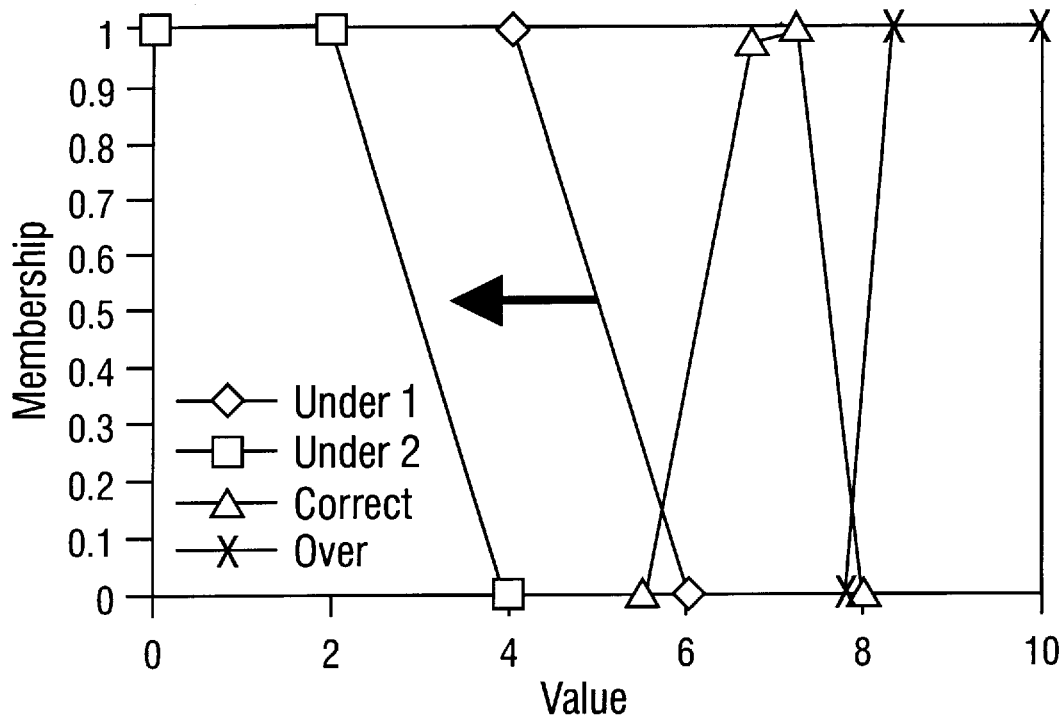
FIG. 7 illustrates the shifting of a membership function for one embodiment in accordance with the present invention.

Suppose a set of circumstances in which the Length can be reliably measured but as a result of a cluttered environment the object may be partially obscured. In the illustration of FIG. 7, the membership function Under has been redefined from "Under 1" to "Under 2." Consider the rule "if Length is Under then Chance is Bad." If Length has a value of 4 and Under is defined by "Under1," then the proposition "Length is Under" has a truth of one (1.0) and the membership function Bad is assigned to Chance with a truth of one (1.0). Assuming the same facts but with Under defined by "Under2," then the proposition "if Length is Under" has a truth of zero (0.0) and the membership function Bad is assigned to Chance with a truth of zero (0.0). Knowledge of the possibility for obscuration is therefore used to dynamically control the definition of Under. Thus, the criterion for identification is adjusted to take advantage of present circumstances. Note that, in this example, the membership function Bad is a penalty imposed when the value is not appropriate for the potential identification presently being evaluated.

Figure 6A:
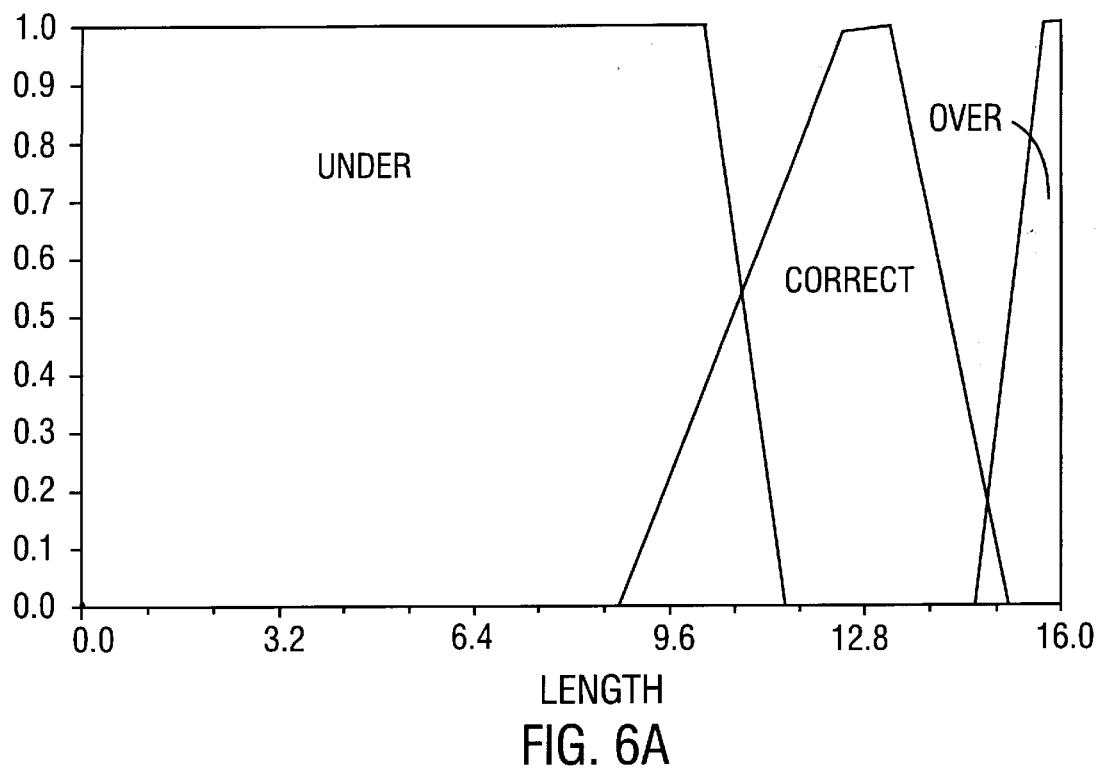
FIGS. 6A, 6B 6C, 6D, 6E and 6F graphically illustrate the membership functions for the input variables in the fuzzy logic process.
Figure 6B:
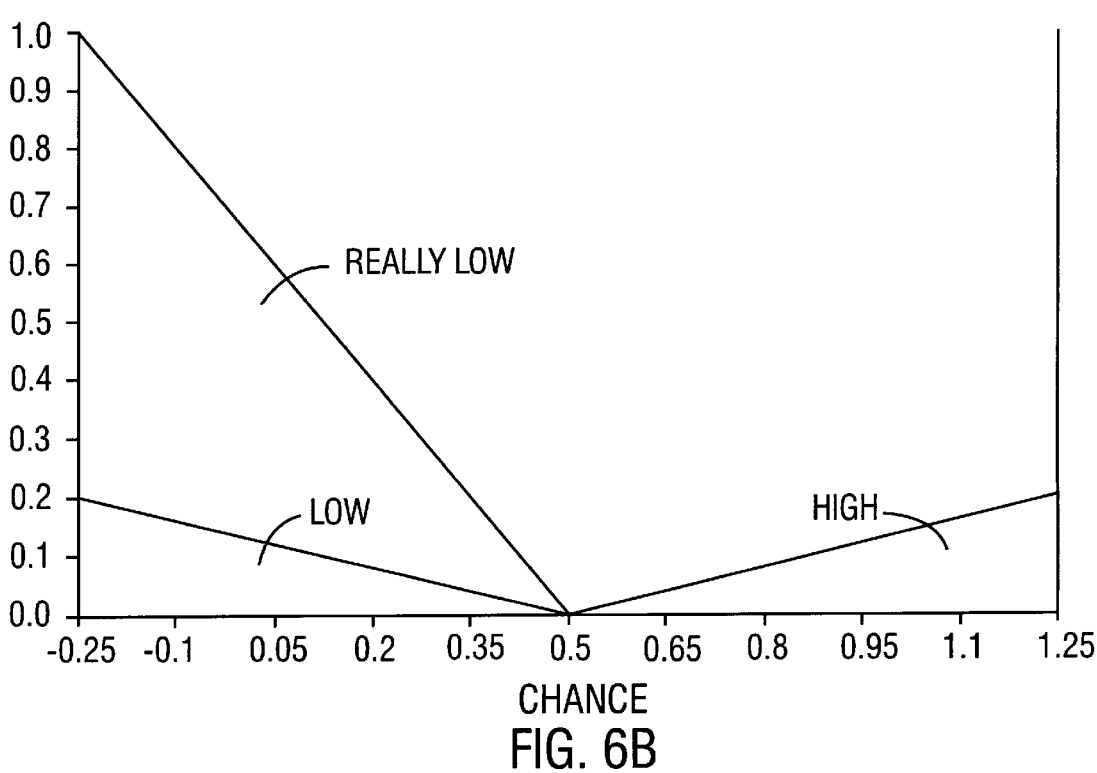
Figure 6C:
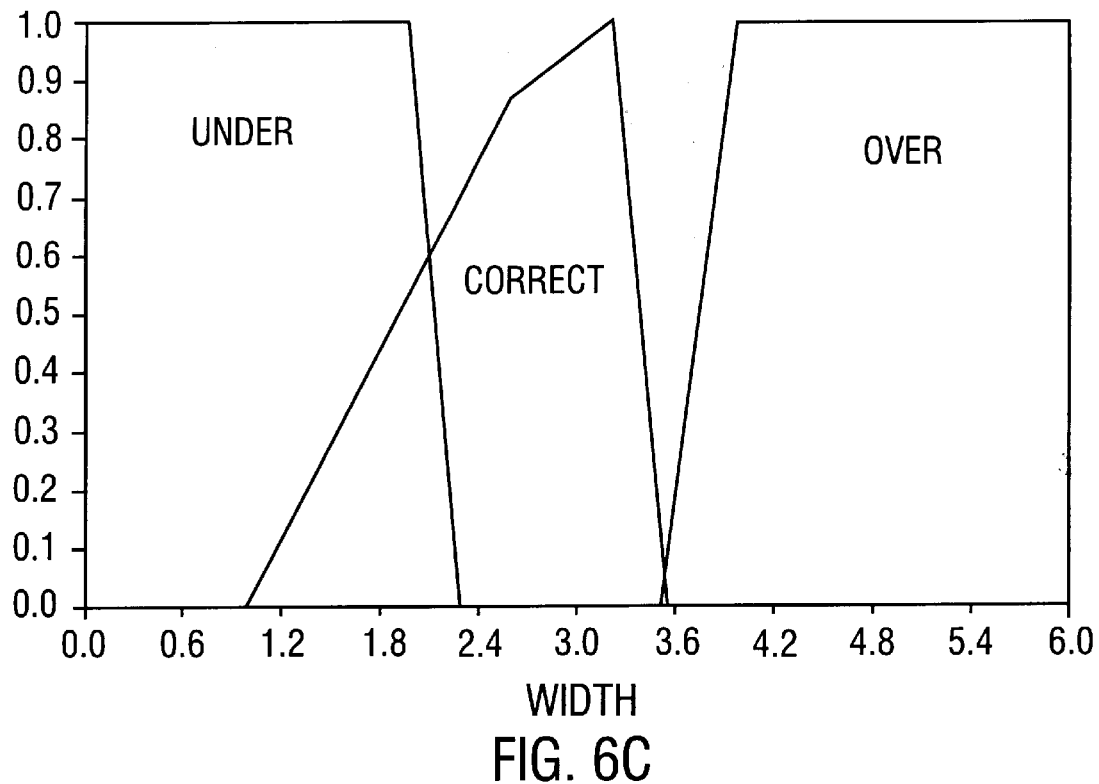
Figure 6D:
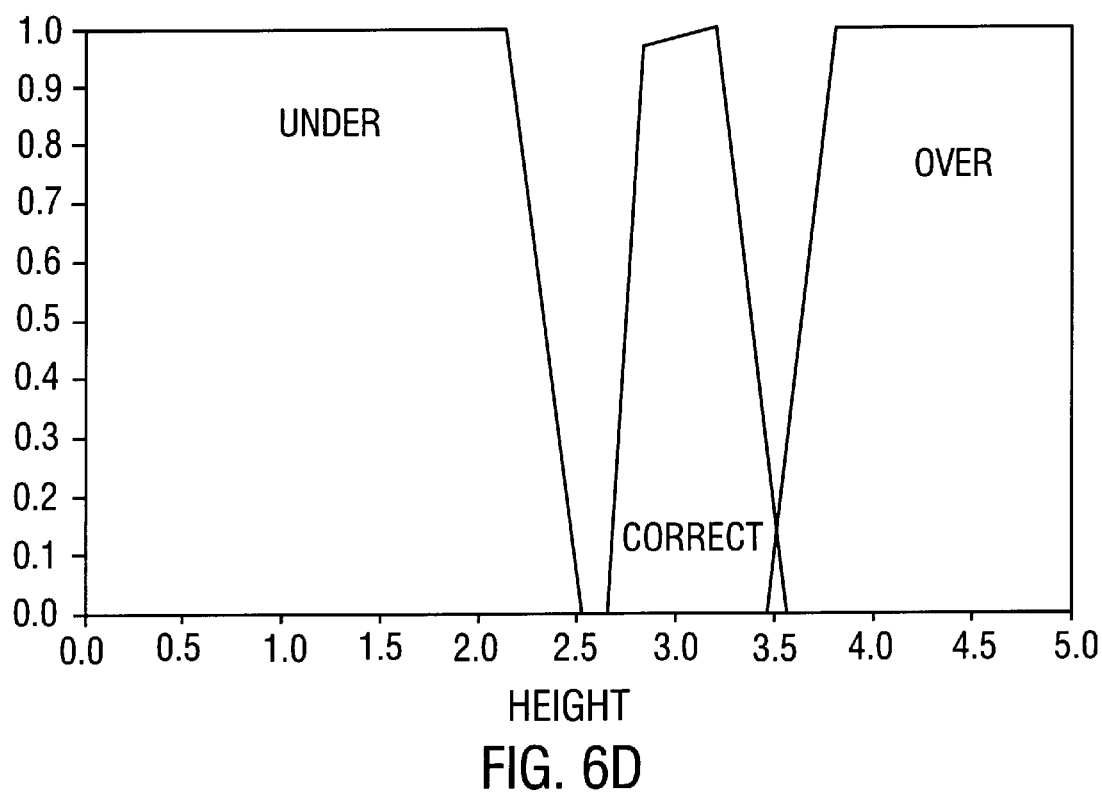
Figure 6E:
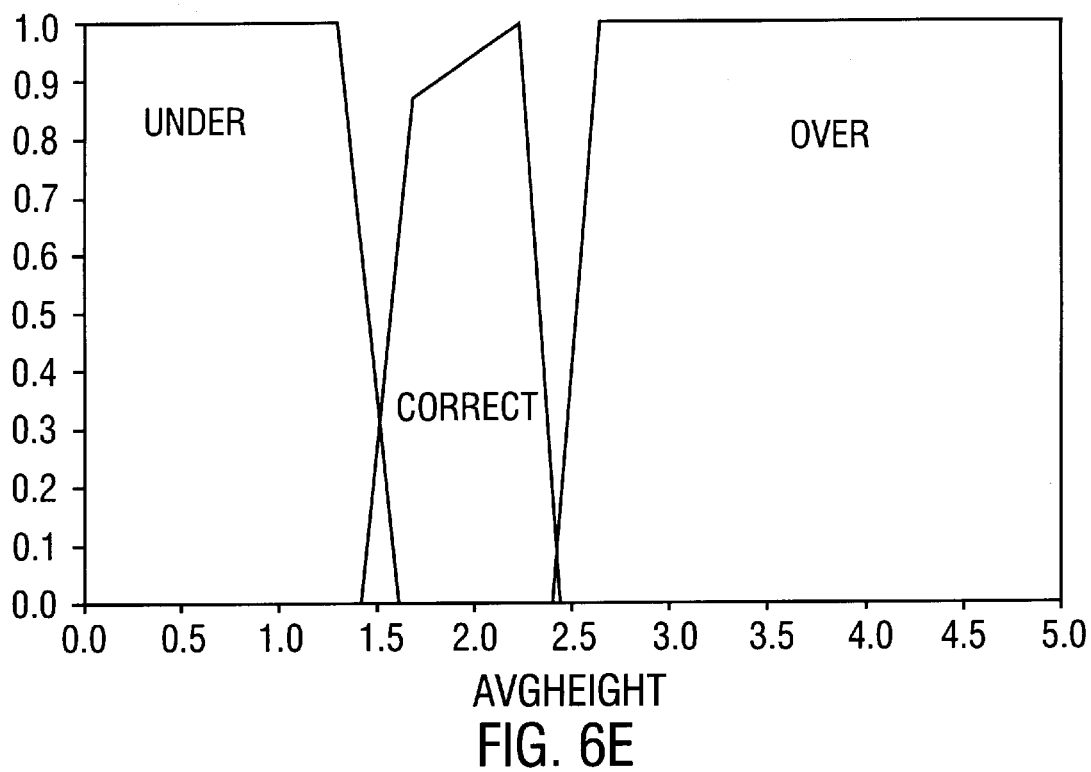
Figure 6F:
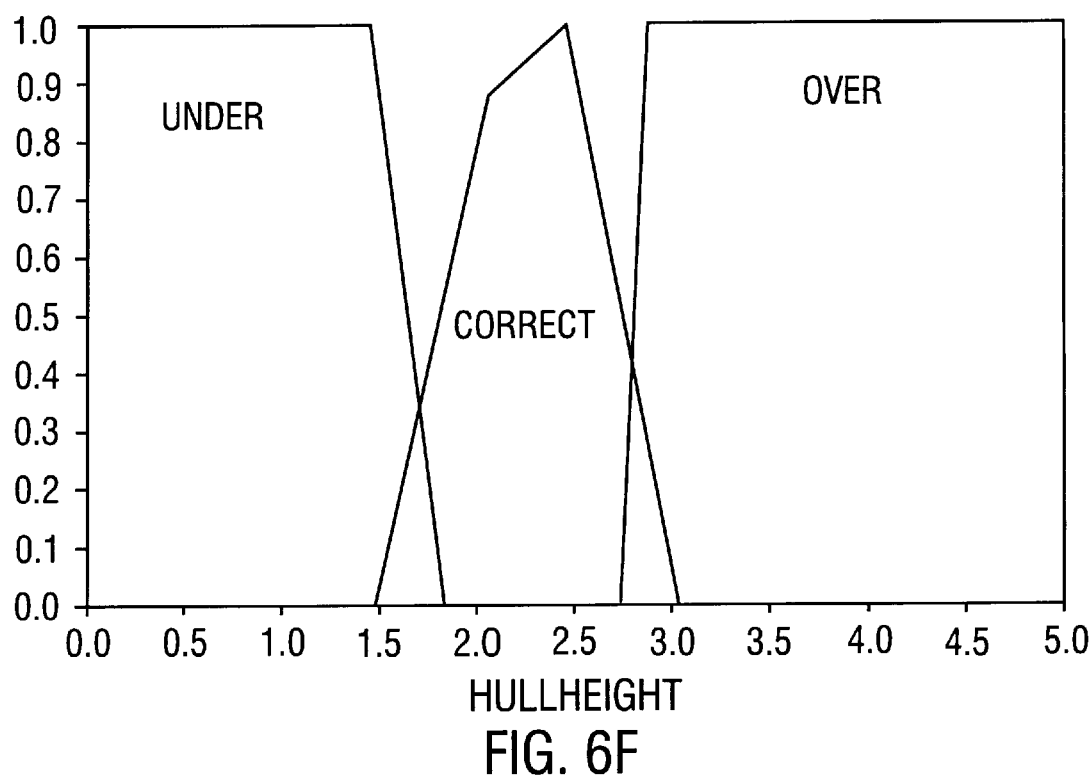

The fuzzy logic process is then executed on the weighted rules with shifted membership functions as set forth above to obtain a value of the output value Chance for each rule in the rulebase. Consider, for instance, the first listed rule in Table 2, the rule "(WtLengthCor) if Length is Correct then Chance is High." The membership functions for the fuzzy input variable Length are illustrated in FIG. 6A. The inferencing process evaluates the rule and to the degree that Length is Correct and including the scaling factor associated with the present value of the rule weight WtLengthCor the output fuzzy variable Chance is assigned the membership function High (shown in FIG. 6B.) The inferencing process continues with all rules and rule weights in the rulebase. After all rules have been evaluated the individual outcomes of each rule inference are combined in the "composition" process to form the completed fuzzy output variable Chance. As described above, "defuzzification" produces a single crisp output value (e.g., 0.85) from the fuzzy output variable, which is intended to represent the likelihood or possibility that the detected segmented object 12 from which the measured values for Length, Width, Height, AverageHeight, and HullHeight corresponds to the potential identification represented by the Correct membership functions.

In the particular embodiment disclosed herein, the indication is the likelihood itself and is the defuzzified output variable Chance in Table 1, Table 2, and in Table 3. In the embodiment of FIG. 8, the object is evaluated against a plurality of potential identifications and the process of weighting rules, shifting membership functions, and comparing the object 12 is performed for each of the potential identifications. Thus, the embodiment of FIG. 8 will yield a plurality of likelihood indications, one for each potential identification.

The object 12 is then identified from the output indications of likelihood in some embodiments of the invention. This identification may be performed in a number of ways depending on the particular implementation. For instance, the potential identification having the highest likelihood of match might be selected as the identification of the object 12. Alternatively, one might take a predetermined number of potential identifications having the highest likelihoods of match and then select one through a process known to the art as three-dimensional model matching. Three-dimensional model matching is well known in the art and may preferably be employed where two or more potential identifications have approximately the same likelihood of match. In such situations, three-dimensional modeling may reliably distinguish among the most likely candidates. Regardless, the scope of the invention is not limited as to how the identification is made from the indications of likelihood.

Finally, in some embodiments, the identification of the object 12 is acted upon. This may entail any number of actions and even omissions. For instance, in the military application illustrated, the platform 18 in FIG. 2 may relay the information to a command post (not shown) where it is stored for future reference, the object 12 may be targeted and attacked, or the object 12 may simply be ignored. The particular act will depend upon the particular implementation and object identification and the invention is not limited in this respect.

Knowledge of the behavior of the LADAR sensor and the resulting three dimensional data has been assimilated to form the foundation and impetus for a new process for object identification using three-dimensional data. The invention disclosed above applies this knowledge and uses two methods for invoking dynamic behavior in the identification process. Rule weights are adjusted to reflect a perceived robustness of a feature, whereas membership functions are adjusted to reflect a change in allowable error for that feature. The invention takes knowledge of the features' robustness and adapts the appropriate weight(s) in the fuzzy logic system. Specifically, the orientation of the object, the range from the LADAR sensor to the object, and the depression angle from the LADAR sensor to the object, are used to influence inferencing in the fuzzy logic based identifier. The invention also takes knowledge of the circumstances needing broader or narrower tolerances and adapts the appropriate membership function(s) in the fuzzy logic system. Specifically, an assessment of the potential that the object may be partially obscured is used to influence inferencing in the fuzzy logic based identifier.

Figure 9:
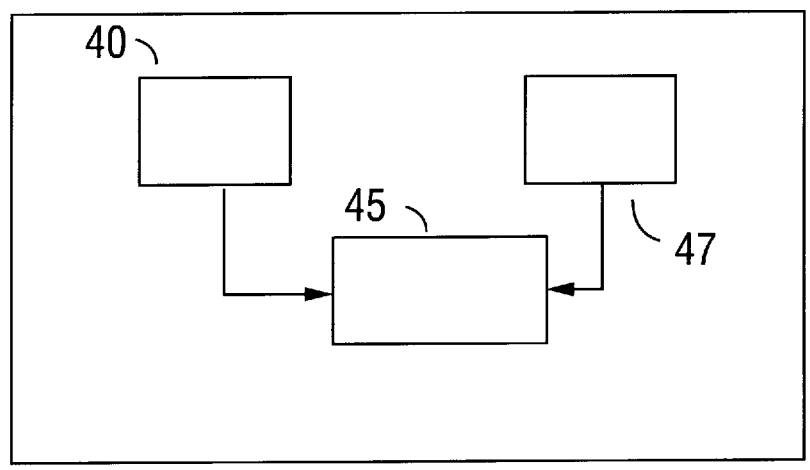
FIG. 9 illustrates computer hardware that may be used to implement the invention in one of its alternative embodiments.

FIG. 9 illustrates how the invention in its various embodiments may be programmed on the program storage device 40. In general, the program storage device 40 stores instructions that, when read and executed by processor 45, performs the method of the invention. In this particular embodiment, the instructions and data necessary to perform the method are stored in program storage device 40, which is a non-volatile memory such as read-only memory ("ROM"), and loaded into a volatile storage device 47, which can be a random access memory ("RAM"), at startup. Many variations along this theme may be implemented. For instance, program storage device 40 and/or processor 45 may be stored aboard either of the platforms 18 shown in FIG. 2 or at some remote point (not shown) to which platform 18 forwards data. Similarly, processor 45 in various embodiments may be a microprocessor, a microcontroller, a digital signal processor ("DSP") or other type of programmable device and may constitute several processors, each designed to perform some portion of the programmed instructions. Still further, the program storage device 40 may be programmed with the method of any of the various embodiments disclosed herein.

It can therefore be seen that the particular embodiments disclosed above are illustrative only as the invention may be modified and practiced in different but equivalent manners apparent to those skilled in the art having the benefit of the teachings herein. Furthermore, no limitations are intended to the details of construction or design herein shown other than as described in the claims below. It is therefore evident that the particular embodiments disclosed above may be altered or modified and all such variations are considered within the scope and spirit of the invention. For instance, some embodiments may shift membership functions before weighting rules even though no such particular embodiment is illustrated in the drawings. Accordingly, the protection sought herein is as set forth in the claims below.

What is claimed is:

1. A method employing fuzzy logic for identifying an object in LADAR data that has been detected and segmented, the method comprising:

extracting a feature of the object;

determining a confidence level in the extracted feature;

comparing the extracted feature to a corresponding feature of a potential identification using a fuzzy logic process including a rulebase, the comparison comprising:

weighting at least one rule in the rulebase according to the confidence level in the extracted feature employed by the rule;

shifting a membership function for the extracted feature responsive to the confidence level for the extracted feature; and executing the fuzzy logic process to obtain an indication of whether the segmented object corresponds to the potential identification; and identifying the object.

2. The method of claim 1, wherein extracting the feature of the object includes ascertaining a value for the extracted feature.

3. The method of claim 1, wherein the extracted feature includes at least one of the length, width, height, hull height and average height of the object.

4. The method of claim 1, wherein each rule is weighted according to n weight factors where n is an integer greater than zero.

5. The method of claim 4, wherein the weight factors include at least one of the orientation of the object with respect to the data acquisition, depression angle from the data acquisition to the object, and the resolution of the data.

6. The method of claim 4, wherein the act of weighting includes:

measuring each of the n weight factors;

accessing for the respective extracted feature an n-dimensional look-up table indexed by each of the weight factors;

ascertaining a predetermined weight from the look-up table; and assigning the predetermined weight to the respective rule.

7. The method of claim 6, wherein the predetermined weight is ascertained by at least one of the following:

truncating each of the measured weight factors to the nearest table index for the respective weight factor and retrieving the predetermined weight from the corresponding location in the n-dimensional look-up table; and interpolating from the table indices corresponding to the measured weight factors and the corresponding weight factors in the look-up table to obtain the predetermined weight.

8. The method of claim 1, wherein the membership functions include under, correct, and over.

9. The method of claim 1, wherein the indication of whether the segmented object corresponds to the potential identification is a likelihood.

10. The method of claim 1, wherein the object is identified by at least one of selecting the potential identification with the highest likelihood of correspondence and performing three-dimensional model matching on a plurality of potential identifications with the highest likelihoods of correspondence.

11. A method for identifying an object from three-dimensional data, the method comprising:

detecting the object;

segmenting the detected object extracts environment;

extracting a feature from the segmented object;

determining a confidence level in the extracted feature; and identifying the object using a fuzzy logic process including:

weighting at least one of a plurality of rules according to the confidence level in the extracted feature employed by the rule;

shifting a membership function for the extracted feature responsive to the confidence level in the extracted feature;

executing the fuzzy logic process to obtain an indication of the segmented object's correspondence to a potential identification; and determining the identity of the object from the indication of correspondence.

12. The method of claim 11, wherein extracting the feature includes ascertaining a value for the extracted feature.

13. The method of claim 11, wherein the extracted feature includes at least one of the length, width, height, hull height, and average height of the object.

14. The method of claim 11, wherein the each rule is weighted according to n weight factors where n is an integer greater than zero.

15. The method of claim 14, wherein the weight factors include at least one of the orientation of the object with respect to the data acquisition, depression angle from the data acquisition to the object, and the resolution of the data.

16. The method of claim 14, wherein the act of weighting includes:

measuring each of the n weight factors;

accessing for the extracted feature an n-dimensional look-up table indexed by each of the weight factors;

ascertaining a predetermined weight from the look-up table; and assigning the predetermined weight to the respective rule.

17. The method of claim 16, wherein the predetermined weight is ascertained by at least one of the following:

truncating each of the measured weight factors to the nearest table index for the respective weight factor and retrieving the predetermined weight from the corresponding location in the n-dimensional look-up table; and interpolating from the table indices corresponding to the measured weight factors and the corresponding weight factors in the look-up table to obtain the predetermined weight.

18. The method of claim 11, wherein the membership functions include under, correct, and over.

19. The method of claim 11, wherein the indication of whether the segmented object corresponds to the potential identification is a likelihood.

20. The method of claim 11, wherein the object is identified by at least one of selecting the potential identification with the highest likelihood of correspondence and performing three-dimensional model matching on a plurality of potential identifications with the highest likelihoods of correspondence.

21. A method implementing an automatic target recognition system identifying an object within a surrounding environment as one of a plurality of potential identifications, the object and the potential identifications having a plurality of predetermined features, the method comprising:

acquiring three-dimensional data regarding the object and the surrounding environment;

detecting the object from the three-dimensional data;

segmenting the detected object from the surrounding environment;

extracting a plurality of features from the segmented object by:

ascertaining values for the extracted features, and determining a confidence level in each of the ascertained values, comparing the object from the extracted features and a plurality of corresponding features of a plurality of potential identifications using a fuzzy logic process, the comparison including:

weighting at least one rule according to the confidence level in the value of the extracted feature employed by the rule;

shifting a membership function for at least one of the extracted features responsive to the confidence level for the each of ascertained values; and executing the fuzzy logic process for each potential identification to obtain an indication of the segmented object's correspondence to that potential identification;

identifying the object from the correspondence indications; and acting on the object identification.

22. The method of claim 21, wherein the three-dimensional data is acquired from a platform that is at least one of in the air and on the ground.

23. The method of claim 21, wherein the three-dimensional data comprises pixels.

24. The method of claim 21, wherein the object that is at least one of in the air and on the ground.

25. The method of claim 21, wherein the data is ranging data.

26. The method of claim 25, wherein the ranging data is LADAR data.

27. The method of claim 21, wherein the object is detected by examining the data for indications of an identifying feature present in all potential identifications.

28. The method of claim 21, wherein the object is segmented by identifying which pixels in the LADAR data represent the object and discarding all other pixels.

29. The method of claim 21, wherein the values for the extracted features are ascertained by measuring the object's features.

30. The method of claim 21, wherein the extracted features include at least one of the length, width, height, hull height, and average height of the object.

31. The method of claim 21, wherein the each rule is weighted according to n weight factors where n is an integer greater than zero.

32. The method of claim 31, wherein the weight factors include at least one of the orientation of the object with respect to the data acquisition, depression angle from the data acquisition to the object, and the resolution of the data.

33. The method of claim 31, wherein the act of weighting includes:

measuring each of the n weight factors;

accessing for the respective extracted feature an n-dimensional look-up table indexed by each of the weight factors;

ascertaining a predetermined weight from the look-up table; and assigning the predetermined weight to the respective rule.

34. The method of claim 33, wherein the predetermined weight is ascertained by at least one of the following:

truncating each of the measured weight factors to the nearest table index for the respective weight factor and retrieving the predetermined weight from the corresponding location in the n-dimensional look-up table; and interpolating from the table indices corresponding to the measured weight factors and the corresponding weight factors in the look-up table to obtain the predetermined weight.

35. The method of claim 21, wherein the membership functions include under, correct, and over.

36. The method of claim 21, wherein the indication of whether the segmented object corresponds to the potential identification is a likelihood.

37. The method of claim 21, wherein the object is identified by at least one of selecting the potential identification with the highest likelihood of correspondence and performing three-dimensional model matching on a plurality of potential identifications with the highest likelihoods of correspondence.

38. The method of claim 21, wherein the object identification is acted upon by at least one of targeting the object, reporting the identification of the object, and recording the identification of the object.

39. A method implementing an automatic target recognition system, the method comprising:

acquiring three-dimensional LADAR data regarding a scanned field of view from a platform that is at least one of in the air and on the ground, wherein:

the LADAR data comprises pixels, and the field of view includes an object that is at least one of in the air and on the ground;

detecting the object by examining the LADAR data for indications of an identifying feature present in a plurality of potential identifications;

segmenting the object from the surrounding environment within the field of view by:

identifying which pixels in the LADAR data represent the object, and discarding all other pixels;

extracting predetermined features from the segmented object by:

measuring the predetermined features, and determining the confidence in the accuracy of the measurements, wherein the predetermined features include the length, width, height, hull height, and average height of the object;

identifying the object by comparing the extracted features with previously stored features of potential identifications using a fuzzy logic process, the fuzzy logic process including:

weighting each rule according to the confidence in the accuracy of the measurement of the extracted feature employed by the rule and according to n weight factors, the weight factors including object orientation with respect to the platform, depression angle from the LADAR acquisition to the object, and the pixel resolution of the LADAR data, the act of weighting including:

measuring each of the n weight factors;

accessing for the respective extracted feature an n-dimensional look-up table indexed by each of the weight factors;

ascertaining a predetermined weight by at least one of the following:

truncating each of the measured weight factors to the nearest table index for the respective weight factor and retrieving the predetermined weight from the corresponding location in the n-dimensional look-up table; and interpolating from the table indices corresponding to the measured weight factors and the corresponding weight factors in the look-up table to obtain the predetermined weight; and assigning the predetermined weight to the respective rule;

shifting a membership function for at least one of the features responsive to the confidence in the feature measurements, the membership functions including under, correct, and over;

executing the fuzzy logic process for each potential identification to obtain an indication of the likelihood of whether the segmented object corresponds to that potential identification; and identifying the object by at least one of selecting the potential identification with the highest likelihood of correspondence and performing three-dimensional model matching on a predetermined number of potential identifications with the highest likelihoods of correspondence; and acting on the object identification by at least one of targeting the object, reporting the identification of the object, and recording the identification of the object.

40. A program storage device readable by a computer, the program storage device encoding statements for performing a method employing fuzzy logic for identifying an object in LADAR data that has been detected and segmented, the method comprising:

extracting a feature of the object;

determining a confidence level in the extracted feature;

comparing the extracted feature to a corresponding feature of a potential identification using a fuzzy logic process including a rulebase, the comparison comprising:

weighting at least one rule in the rulebase according to the confidence level in the extracted feature employed by the rule;

shifting a membership function for the extracted feature responsive to the confidence level for the extracted feature; and executing the fuzzy logic process to obtain an indication of whether the segmented object corresponds to the potential identification; and identifying the object.

41. The program storage device claim 40, wherein extracting the feature of the object in the programmed method includes ascertaining a value for the extracted feature.

42. The program storage device of claim 40, wherein the extracted feature in the programmed method includes at least one of the length, width, height, hull height, and average height of the object.

43. The program storage device of claim 40, wherein each rule in the programmed method is weighted according to n weight factors where n is an integer greater than one.

44. The program storage device of claim 43, wherein the weight factors in the programmed method include at least one of the orientation of the object with respect to the data acquisition, depression angle from the data acquisition to the object, and the resolution of the data.

45. The program storage device of claim 43, wherein the act of weighting in the programmed method includes:

measuring each of the n weight factors;

accessing for the respective extracted feature an n-dimensional look-up table indexed by each of the weight factors;

ascertaining a predetermined weight from the look-up table; and assigning the predetermined weight to the respective rule.

46. The program storage device of claim 45, wherein the predetermined weight in the programmed method is ascertained by at least one of the following:

truncating each of the measured weight factors to the nearest table index for the respective weight factor and retrieving the predetermined weight from the corresponding location in the n-dimensional look-up table; and interpolating from the table indices corresponding to the measured weight factors and the corresponding weight factors in the look-up table to obtain the predetermined weight.

47. The program storage device of claim 40, wherein the membership functions in the programmed method include under, correct, and over.

48. The program storage device of claim 40, wherein the indication of whether the segmented object corresponds to the potential identification in the programmed method is a likelihood.

49. The program storage device of claim 40, wherein the object is identified in the programmed method by at least one of selecting the potential identification with the highest likelihood of correspondence and performing three-dimensional model matching on a plurality of potential identifications with the highest likelihoods of correspondence.

50. A program storage device readable by a computer, the program storage device encoding statements for performing a method for identifying an object from three-dimensional data, the method comprising:

detecting the object;

segmenting the detected object from its environment;

extracting a feature from the segmented object;

determining a confidence level in the extracted feature; and identifying the object using a fuzzy logic process including:

weighting at least one of a plurality of rules according to the confidence level in the extracted feature employed by the rule;

shifting a membership function for the extracted feature responsive to the confidence level for the extracted feature;

executing the fuzzy logic process to obtain an indication of the segmented object's correspondence to potential identification; and determining the identity of the object from the indication of correspondence.

51. The program storage device of claim 50, wherein extracting the feature in the programmed method includes ascertaining a value for the extracted feature.

52. The program storage device of claim 50, wherein the extracted feature in the programmed method includes at least one of the length, width, height, hull height, and average height of the object.

53. The program storage device of claim 50, wherein each rule in the programmed method is weighted according to n weight factors where n is an integer greater than zero.

54. The program storage device of claim 53, wherein the weight factors in the programmed method include at least one of the orientation of the data acquisition with respect to the object, depression angle of the data acquisition with respect to the object, and the resolution of the data.

55. The program storage device of claim 53, wherein the act of weighting in the programmed method includes:

measuring each of the n weight factors;

accessing for the extracted feature an n-dimensional look-up table indexed by each of the weight factors;

ascertaining a predetermined weight from the look-up table; and assigning the predetermined weight to the respective rule.

56. The program storage device of claim 55, wherein the predetermined weight in the programmed method is ascertained by at least one of the following:

truncating each of the measured weight factors to the nearest table index for the respective weight factor and retrieving the predetermined weight from the corresponding location in the n-dimensional look-up table; and interpolating from the table indices corresponding to the measured weight factors and the corresponding weight factors in the look-up table to obtain the predetermined weight.

57. The program storage device of claim 50, wherein the membership functions in the programmed method include under, correct, and over.

58. The program storage device of claim 50, wherein the indication of whether the segmented object corresponds to the potential identification in the programmed method is a likelihood.

59. The program storage device of claim 50, wherein the object is identified in the programmed method by at least one of selecting the potential identification with the highest likelihood of correspondence and performing three-dimensional model matching on a plurality of potential identifications with the highest likelihoods of correspondence.

60. A program storage device readable by a computer, the program storage device encoding statements for performing a method implementing an automatic target recognition system identifying an object within a surrounding environment as one of a plurality of potential identifications, the object and the potential identifications having a plurality of predetermined features, the program storage device readable by a computer, the program storage device encoding statements for performing a method comprising:

acquiring three-dimensional data regarding the object and the surrounding environment;

detecting the object from the three-dimensional data;

segmenting the detected object from the surrounding environment;

extracting a plurality of features from the segmented object by:
ascertaining values for the extracted features, and
determining a confidence level in each of the ascertained values, comparing the object from the extracted features and a plurality of corresponding features of a plurality of potential identifications using a fuzzy logic process, the comparison including:
weighting at least one rule according to the confidence level in the value of the extracted feature employed by the rule;
shifting a membership function for at least one of the extracted features responsive to the confidence level for each of the ascertained values; and executing the fuzzy logic process for each potential identification an indication of the segmented object's correspondence to that potential identification;

identifying the object from the correspondence indications; and acting on the object identification.

61. The program storage device of claim 60, wherein the three-dimensional data in the programmed method is acquired from a platform that is at least one of in the air and on the ground.

62. The program storage device of claim 60, wherein the three-dimensional data in the programmed method comprises pixels.

63. The program storage device of claim 60, wherein the object in the programmed method that is at least one of in the air and on the ground.

64. The program storage device of claim 60, wherein the data in the programmed method is ranging data.

65. The program storage device of claim 64, wherein the ranging data in the programmed method is LADAR data.

66. The program storage device of claim 60, wherein the object is detected in the programmed method by examining the data for indications of an identifying feature present in all potential identifications.

67. The program storage device of claim 60, wherein the object is segmented in the programmed method by identifying which pixels in the LADAR data represent the object and discarding all other pixels.

68. The program storage device of claim 60, wherein the values for the extracted features in the programmed method are ascertained by measuring the object's features.

69. The program storage device of claim 60, wherein the extracted features in the programmed method include at least one of the length, width, height, hull height, and average height of the object.

70. The program storage device of claim 60, wherein each rule in the programmed method is weighted according to n weight factors where n is an integer greater than zero.

71. The program storage device of claim 70, wherein the weight factors in the programmed method include at least one of the orientation of the object with respect to the data acquisition, depression angle from the data acquisition to the object, and the resolution of the data.

72. The program storage device of claim 70, wherein the act of weighting in the programmed method includes:
measuring each of the n weight factors;
accessing for the respective extracted feature an n-dimensional look-up table indexed by each of the weight factors;
ascertaining a predetermined weight from the look-up table; and
assigning the predetermined weight to the respective rule.

73. The program storage device of claim 72, wherein the predetermined weight in the programmed method is ascertained by at least one of the following:
truncating each of the measured weight factors to the nearest table index for the respective weight factor and retrieving the predetermined weight from the corresponding location in the n-dimensional look-up table; and
interpolating from the table indices corresponding to the measured weight factors and the corresponding weight factors in the look-up table to obtain the predetermined weight.

74. The program storage device of claim 60, wherein the membership functions in the programmed method include under, correct, and over.

75. The program storage device of claim 60, wherein the indication of whether the segmented object corresponds to the potential identification in the programmed method is a likelihood.

76. The program storage device of claim 60, wherein the object is identified in the programmed method by at least one of selecting the potential identification with the highest likelihood of correspondence and performing three-dimensional model matching on a plurality of potential identifications with the highest likelihood of correspondence.

77. The program storage device of claim 60, wherein the object identification in the programmed method is acted upon by at least one of targeting the object, reporting the identification of the object, and recording the identification of the object.

78. A program storage device readable by a computer, the program storage device encoding statements for performing a method implementing an automatic target recognition system, the program storage device readable by a computer, the program storage device encoding statements for performing a method comprising:

acquiring three-dimensional LADAR data regarding a scanned field of view from a platform that is at least one of in the air and on the ground, wherein:

the LADAR data comprises pixels, and
the field of view includes an object that is at least one of in the air and on the ground;

detecting the object by examining the LADAR data for indications of an identifying feature present in a plurality of potential identifications;

segmenting the object from the surrounding environment within the field of view by:
 identifying which pixels in the LADAR data represent the object, and
 discarding all other pixels;

extracting predetermined features from the segmented object by:
 measuring the predetermined features, and
 determining the confidence in the accuracy of the measurements,
 wherein the predetermined features include the length, width, height, hull height, and average height of the object;

identifying the object by comparing the extracted features with previously stored features of potential identifications using a fuzzy logic process, the fuzzy logic process including:
 weighting each rule according to the confidence in the accuracy of the measurements of the extracted feature employed by the rule and according to n weight factors, the weight factors including object orientation with respect to the platform, depression angle from the LADAR acquisition to the object, and the pixel resolution of the LADAR data, the act of weighting including:
  measuring each of the n weight factors;
  accessing for the respective extracted feature an n-dimensional look-up table indexed by each of the weight factors;
  ascertaining a predetermined weight by at least one of the following:
   truncating each of the measured weight factors to the nearest table index for the respective weight factor and retrieving the predetermined weight from the corresponding location in the n-dimensional look-up table; and
   interpolating from the table indices corresponding to the measured weight factors and the corresponding weight factors in the look-up table to obtain the predetermined weight; and
  assigning the predetermined weight to the respective rule;
 shifting a membership function for at least one of the features responsive to the confidence in the feature measurements, the membership functions including under, correct, and over;
 executing the fuzzy logic process for each potential identification to obtain an indication of the likelihood of whether the segmented object corresponds to that potential identification; and
 identifying the object by at least one of selecting the potential identification with the highest likelihood of correspondence and performing three-dimensional model matching on a predetermined number of potential identifications with the highest likelihoods of correspondence; and acting on the object identification by at least one of targeting the object, reporting the identification of the object, and recording the identification of the object.

\* \* \* \* \*

UNITED STATES PATENT AND TRADEMARK OFFICE
CERTIFICATE OF CORRECTION

PATENT NO. : 5,893,085
DATED : April 6, 1999
INVENTOR(S) : Phillips et al.

It is certified that error appears in the above-identified patent and that said Letters Patent is hereby corrected as shown below:

Column 15, line 44 (claim 11), change "extracts" to --from its--.

Column 19, line 27 (claim 41), after "device" insert --of--.

Signed and Sealed this

Seventeenth Day of August, 1999

Attest:

Q. TODD DICKINSON

*Attesting Officer*   *Acting Commissioner of Patents and Trademarks*